July 30, 1968 B. WEIR 3,395,265

TEMPERATURE CONTROLLED MICROCIRCUIT

Filed July 26, 1965

INVENTOR.
BASIL WEIR

BY Flehr and Swain

ATTORNEYS

United States Patent Office 3,395,265 Patented July 30, 1968

3,395,265

TEMPERATURE CONTROLLED MICROCIRCUIT

Basil Weir, Palo Alto, Calif., assignor, by mesne assignments, to Teledyne Inc., Hawthorne, Calif., a corporation of Delaware Filed July 26, 1965, Ser. No. 474,931
3 Claims. (Cl. 219—209)

ABSTRACT OF THE DISCLOSURE

A temperature controlled microcircuit with the temperature sensing means and heater means both integrated into the microcircuit. The microcircuit is mounted on a copper heat sink supported by a glass base. Temperature sensing is accomplished by a Wheatstone bridge which provides a controlled output if the temperature of the microcircuit falls below a predetermined level to energize the heater which is an integrated resistor in the microcircuit. The microcircuit itself is enclosed in a header to insulate the circuit from ambient conditions.

The present invention is directed to a temperature controlled microcircuit and, more particularly, to a microcircuit which is effectively isolated from the temperature variations of its enviroment.

Solid state circuits, in general, are well known for their sensitivity to temperature changes. For example, in a transistor, $h_{FE}$ and $I_{CBO}$ will increase and $V_{BE}$ will decrease with rising temperatures. Past remedies to compensate for temperature variations have either offered only a partial solution or have been expensive or overly complex in adding additional circuit components. Moreover, when these temperature control measures are applied to microcircuits which have extremely limited areas available, the control problem using these past remedies is magnified considerably.

It is, therefore, a major object of the present invention to provide an improved temperature controlled microcircuit.

It is another object of the invention to provide a temperature controlled microcircuit which is effectively isolated from the effects of a fluctuating ambient temperature.

It is yet another object of the invention to provide a temperature controlled microcircuit in which the controlling elements are an integral part of the microcircuits.

These and other objects of the invention will become more thoroughly apparent from the following description when taken in conjunction with the accompanying drawing.

Referring to the drawing.

Figure 1:
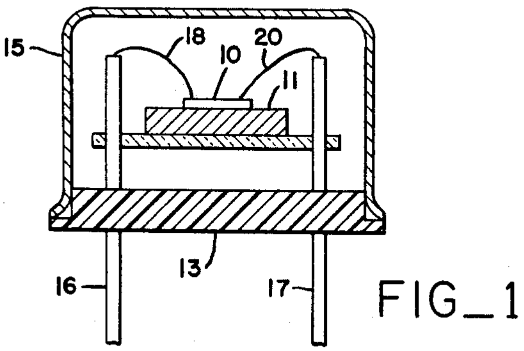
FIGURE 1 is a simplified cross-sectional view of a device incorporating the invention.

In FIGURE 1, the invention is shown in its operating package and includes a chip microcircuit 10 which is mounted on a copper heat sink 11, which, in turn, is affixed to an insulating base 12, such as glass. Heat sink 11 provides a uniform temperature throughout the microcircuit. A header 13 with a cap 15 surrounds the microcircuit and is in spaced relationship therewith. Microcircuit 10 is suspended within the header 13, 15 in an isolated environment by electrically conductive leads 16 and 17 which extend through header base 13 to support the insulating base 12.

Suitable circuit connections 18 and 20 couple leads 16 and 17 to the microcircuit. In practice, the complete structure would have additional leads, the number of leads depending on the circuit function performed by the microcircuit.

Figures 2, 3:
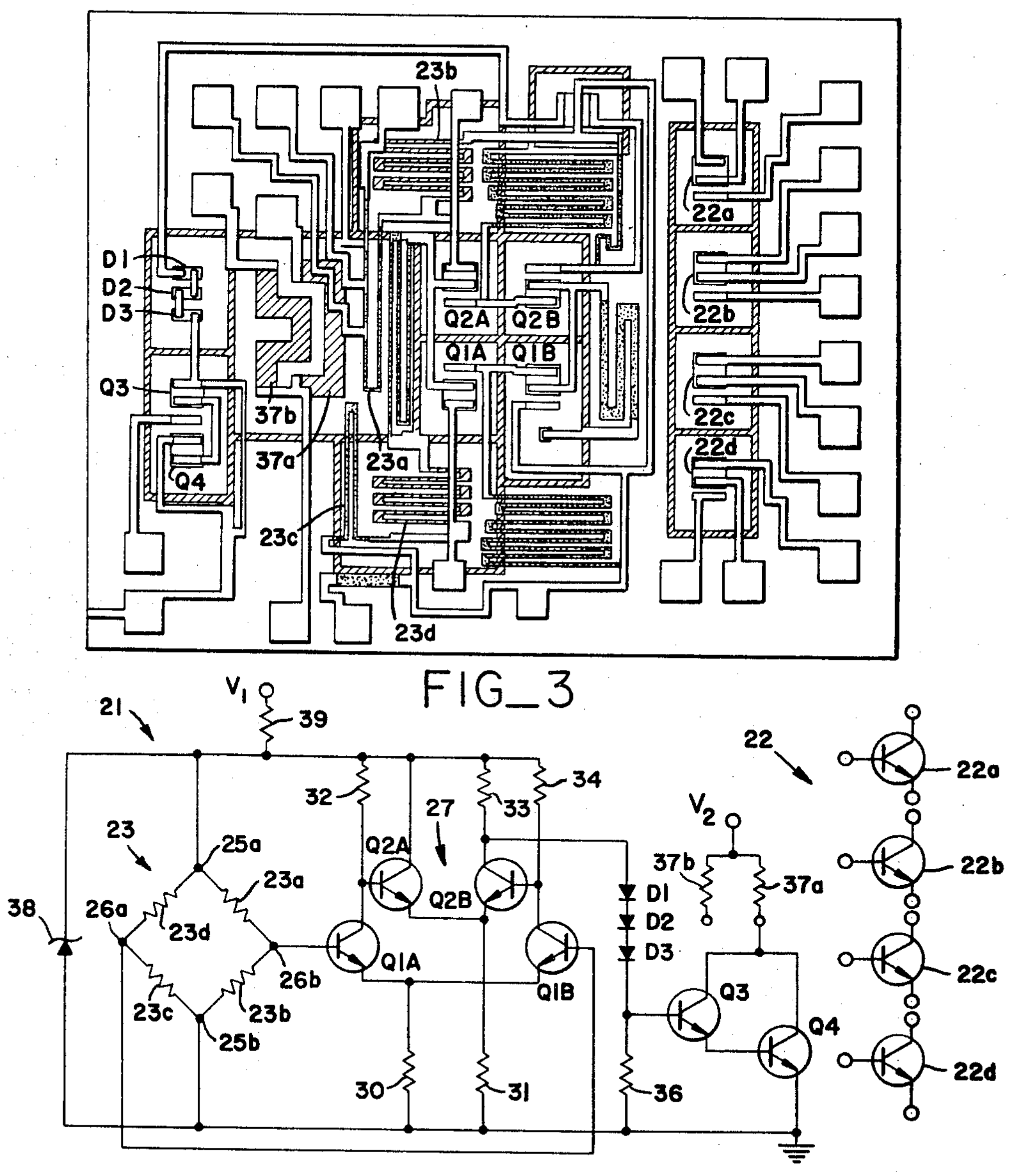
FIGURE 2 is a schematic diagram of a portion of FIGURE 1.
FIGURE 3 is a plan view of a printed microcircuit of the schematic circuit shown in FIGURE 2.

The specific means for controlling the temperature of chip microcircuit 10 is shown in detail in FIGURE 2 which is a schematic representation of typical circuits formed in the chip.

The chip includes as integral components a temperature controller assembly 21 and associated working circuits 22, which are schematically illustrated as transistors 22*a*–22*d*, for which accurate temperature control is desired in order to reduce the variability in operating characteristics as discussed above. Temperature controller 21 comprises a Wheatstone type bridge 23 with arms 23*a–d* having alternating positive and negative temperature coefficients of resistance; that is, resistors 23*a* and 23*c* have a negative temperature coefficient of resistance and resistors 23*b* and 23*d* have a positive temperature coefficient of resistance. With this type of alternation of coefficients, the sensitivity of the bridge to temperature change is optimized.

From a constructional point of view, the positive resistors 23*b* and 23*d* are made of p-type silicon which has been diffused into the silicon surface of semiconductor chip 10 by conventional means. The negative coefficient resistors 23*a* and 23*c* are produced by laying down on a silicon oxide surface of the chip microcircuit pure tantalum evaporated film which has been formed into a proper pattern by photoresist methods. Bridge 23 is supplied operating potential at points 25*a* and 25*b* from a potential source $V_1$.

The output voltage of the bridge 23 appears across junctions 26*a* and 26*b* and is zero if the temperature of the microcircuit is at a predetermined level. At temperatures above this level, bridge 23 will produce an error signal of one polarity and at temperatures below the predetermined level, the error signal will be of an opposite polarity.

When the temperature is below the predetermined level, the error signal produced across points 26*a* and 26*b* is coupled to the two inputs of a differential amplifier circuit 27. The amplifier circuit comprises four transistors; the first stage consists of transistors Q1A and Q1B, and the second stage of Q2A and Q2B. Suitable load and biasing resistors 30–34 are also coupled to the transistors in a manner well known in the art.

The bridge voltage output of 26*a* and 26*b* is directly coupled to the base connections of transistors Q1A and Q1B respectively. The output of the differential amplifier appears at the collector of transistor Q2B which output has its level dropped through series connected diodes D1, D2, and D3. Diode D3 is connected to ground through a load resistance 36. The error signal is thereafter coupled to a power stage comprising series connected transistors Q3 and Q4 by means of a lead from the base of Q3 coupled to the junction between diode D3 and load resistance 36.

Heater means for controlling the temperature of the microcircuit include resistors 37*a* and 37*b* which are connected to the coupled collectors of transistors Q3 and Q4. A common potential source $V_2$ supplies the heater resistors which are connected into the circuit either singly or in parallel depending on the control requirements and the magnitude of $V_2$. The resistors are integrated into the microcircuit in the same manner as the silicon resistors of the Wheatstone bridge.

A regulated voltage from $V_1$ is supplied to both bridge circuit 23 and differential amplifier 27 by the provision of a Zener type diode 38, which is series connected between ground, a dropping resistor 39, and the voltage source $V_1$.

FIGURE 3 illustrates the actual chip microcircuit and its physical configuration. The reference numerals on the microcircuit correspond to the numerals on the schematic diagrams and to that particular circuit component. Only the major components have been indicated for purposes of simplicity.

In accordance with the invention, the temperature of microcircuit 10 is automatically regulated at a temperature, $T_B$. Regulation of temperature is achieved by maintaining the microcircuit at a temperature level which is always above that of ambient temperature $T_A$ to thus produce a continuous heat transfer from heat sink 11 to header 13, 15. This heat transfer W may be expressed by the formula $$W=\frac{T_B-T_A}{R_T}\text{ watts}$$

where $R_T$ is in degrees centigrade per watt and is the thermal resistance of the air between heat sink 11 and header 13, 15.

If the ambient temperature is quite low, a large error signal will be produced across Wheatstone bridge temperature sensing device 23 to cause the heater 37*a* to produce a large heat output to maintain the temperature of the microcircuit at $T_B$; on the other hand, as the ambient rises, the heating effect will naturally be reduced.

There must always be some temperature differential in order to maintain the microcircuit at its fixed level since the bridge 23 and the working circuits 22 have some standby minimum heat dissipation. On the other hand, the maximum $T_B$ is limited by the operating characteristics of the circuit components. Thus, the final determination of the operating temperature $T_B$ depends on the factors of the expected ambient temperatures, the amount of heat transfer $R_T$, the temperature characteristics of the circuits themselves, and the minimum heat which must be dissipated.

As with any type of control circuit in which a sensing device produces an error signal to maintain some parameter at a predetermined level, there will exist a dynamic equilibrium. In the case of the present invention, the temperature at which the bridge will balance will be slightly different than the actual temperature of the microcircuit $T_B$. To reduce this error, $R_T$ should ideally be made as large as possible; however, the countervailing consideration of the maximum operating temperature limits. In other words, since a minimum amount of heat must be dissipated at all times, a very high $R_T$ would require an operating temperature so high as to be totally impractical. The minimum value of $R_T$ is determined by the heating capabilities of heater resistors 37*a* and 37*b*, the type of space insulating microcircuit 10 and header 13, 15, and the desired average temperature differential between the two components. For optimum operation, $R_T$ has a value which is substantially greater than the thermal resistance of heat sink 11.

Thus, the present invention provides an improved temperature controlled microcircuit which, by the stabilization of temperature, effectively reduces circuit variations. In addition to stabilizing reference elements and low level DC amplifiers, the temperature controller can be used to reduce the frequency drift with temperature of voltage controlled multivibrators, the pass band characteristics of active filter elements, the trip point of Schmitt triggers, comparators, flip-flops, and other microcircuit which has parameters that fluctuate with temperature in an undesirable manner. The controller is simple enough so that its additional cost would not prohibit its use in most systems. From a reliability point of view, the controller enhances rather than detracts from system reliability since it reduces environmental extremes on the controlled device. Also, if the controller should fail to operate, the system is not affected except that its safe operating margin is reduced in the low temperature regions.

I claim:

1. A temperature controlled microcircuit comprising: a microcircuit mounted on a heat sink; a header surrounding and spaced from said microcircuit for insulating said microcircuit from ambient conditions; means for suspending said microcircuit within said header; heater means integrated into said microcircuit for controlling the temperature of said microcircuit; and temperature sensitive means integrated into said microcircuit and coupled to said heater means and responsive to the temperature level of said microcircuit for activating said heater means to maintain said level at a predetermined value.

2. A temperature controlled microcircuit as in claim 1 in which said space between said header and said microcircuit has a substantially greater thermal resistance than said heat sink.

3. A temperature controlled microcircuit as in claim 1 in which said suspending means include an insulating member carrying said heat sink, such member being mounted on electrically conductive leads extending through said header.

References Cited

UNITED STATES PATENTS

| | | | |
|---|---|---|---|
| 2,301,008 | 11/1942 | Baldwin | 219—210 |
| 2,973,420 | 2/1961 | Craiglow et al. | 219—209 X |
| 3,067,613 | 12/1962 | Rasmussen et al. | 73—362 |
| 3,071,676 | 1/1963 | Van Sandwyk | 219—501 |
| 3,136,877 | 6/1964 | Heller | 219—499 |

FOREIGN PATENTS

| | | |
|---|---|---|
| 1,404,217 | 5/1965 | France. |

RICHARD M. WOOD, *Primary Examiner.*

C. L. ALBRITTON, *Assistant Examiner.*